(12) United States Patent
Vlassiouk et al.

(10) Patent No.: US 12,122,678 B1
(45) Date of Patent: Oct. 22, 2024

(54) WATER BASED SOLUTION FOR DECOUPLING GRAPHENE FROM COPPER SUBSTRATES BY OXIDATION

(71) Applicant: General Graphene Corp., Knoxville, TN (US)

(72) Inventors: Ivan V. Vlassiouk, Oak Ridge, TN (US); Michael Stanford, Knoxville, TN (US)

(73) Assignee: General Graphene Corp., Knoxville, TN (US)

( * ) Notice: Subject to any disclaimer, the term of this patent is extended or adjusted under 35 U.S.C. 154(b) by 988 days.

(21) Appl. No.: 17/026,602

(22) Filed: Sep. 21, 2020

(51) Int. Cl.
| | | |
|---|---|---|
| *B32B 43/00* | (2006.01) | |
| *C01B 32/19* | (2017.01) | |
| *C01B 32/205* | (2017.01) | |
| *C01B 32/225* | (2017.01) | |
| *C08J 7/06* | (2006.01) | |
| *C09D 1/00* | (2006.01) | |

(52) U.S. Cl.
CPC ............ *C01B 32/19* (2017.08); *C01B 32/205* (2017.08); *C01B 32/225* (2017.08); *C08J 7/06* (2013.01); *C09D 1/00* (2013.01); *B32B 43/006* (2013.01); *Y10T 156/1111* (2015.01); *Y10T 156/1116* (2015.01)

(58) Field of Classification Search
CPC ............ B32B 43/006; Y10T 156/1111; Y10T 156/1116; C01B 32/19; C01B 32/225
See application file for complete search history.

(56) References Cited

U.S. PATENT DOCUMENTS

| | | | |
|---|---|---|---|
| 10,065,402 B2 | 9/2018 | Kim et al. | |
| 10,369,775 B2 | 8/2019 | Brems et al. | |
| 2012/0258311 A1* | 10/2012 | Hong | B82Y 30/00 428/688 |
| 2013/0220530 A1* | 8/2013 | Gong | C25F 5/00 156/247 |
| 2015/0291431 A1* | 10/2015 | Tang | H01G 11/32 264/105 |
| 2016/0137507 A1 | 5/2016 | You et al. | |
| 2018/0162115 A1* | 6/2018 | Brems | C01B 32/184 |
| 2018/0339906 A1* | 11/2018 | Lu | C01B 32/19 |

(Continued)

FOREIGN PATENT DOCUMENTS

EP  3624170 A1  3/2020

OTHER PUBLICATIONS

Gupta, et al., A facile process for soak-and-peel delamination of CVD graphene from substrates using water, Sci. Rep., 2014, 4, 3882.

(Continued)

*Primary Examiner* — Philip C Tucker
*Assistant Examiner* — Nickolas R Harm
(74) *Attorney, Agent, or Firm* — Luedeka Neely, P.C.

(57) ABSTRACT

A method for delaminating a graphene layer from a metal catalyst substrate. The method includes depositing the graphene layer on the metal catalyst substrate to form a layered structure and soaking the layered structure in a water-based solution comprising water and a water-miscible organic solvent such that the water-based solution intercalates between the graphene layer and the metal catalyst substrate and oxidizes the metal catalyst substrate for delamination of the graphene layer from the metal catalyst substrate.

17 Claims, 5 Drawing Sheets

(56) References Cited

U.S. PATENT DOCUMENTS

2019/0119115 A1* 4/2019 Mellor .................. C25C 1/06
2020/0328407 A1* 10/2020 Jang .................. H01M 4/624

OTHER PUBLICATIONS

Koenig et al., Ultrastrong adhesion of graphene membranes, Nat. Nanotechnol. 6, 9, 2011, 543-546.
Lu et al., Decoupling of CVD graphene by controlled oxidation of recrystallized Cu, RSC Adv., 2012, 2, 3008.
Luo et al., Role of graphene in water-assisted oxidation of copper in relation to dray transfer of graphene, Chem. Mater., 2017, 29, 4546-4556.
Schriver et al., Graphene as a Long-Term Metal Oxidation Barrier: Worse Than Nothing, ACS Nano, 2013, 7, 5763.
Wang et al., Catalyst interface engineering for improved 2D film lift-off and transfer, ACS Appl. Mater. Interfaces, 2016, 8, 33072-33082.
Wu et al., Detaching graphene from copper substrate by oxidation-assisted water intercalation, Carbon, 2016, 98, 138.
Kin et al., Adhesion energy of as-grown graphene on copper foil with a blister test, Carbon, 123, 243, 2017.

\* cited by examiner

WATER BASED SOLUTION FOR DECOUPLING GRAPHENE FROM COPPER SUBSTRATES BY OXIDATION

FIELD

This invention relates to the field of decoupling 2D materials from a metal catalyst substrate material. More particularly, this invention relates to using a water-based solution that includes an organic solvent to efficiently oxidize the surface of the metal substrate material to assist in delaminating the 2D material from the substrate material.

BACKGROUND

In recent years chemical vapor deposition (CVD) has emerged as one of the best ways to produce graphene as well as other 2D materials. Typically, the 2D material is grown on a metal catalyst substrate during the CVD process. For example, graphene is often grown on a copper catalyst substrate. In order to be used in other applications, the graphene layer must be delaminated from the metal catalyst substrate. However, as a result of being grown on copper substrates at very high temperatures, graphene has a very intimate and strong attachment with the copper catalyst, making it difficult and costly to remove the graphene from its copper substrate.

The most common method for removing graphene from its copper catalyst substrate is often referred to as a "wet transfer" where the copper catalyst substrate is etched away, leaving the graphene layer. Also, a reinforcing layer (typically a polymer layer) may be applied to the graphene layer for mechanical reinforcement and easier handling. The layered structure may then be put in copper etchant solutions such as iron chloride ($FeCl_3$), ammonia persulfate (($NH_4)_2S_2O_8$), and other etchants as known in the art. The copper substrate will be etched away by the etchant solution while the graphene-polymer sandwich floats at the top of the etchant solution.

The wet transfer process described above has several disadvantages. In particular, the process is costly and inefficient. In this regard, the most significant factor to the overall cost of graphene production is typically the cost of the copper catalyst substrate. The dissolution of the copper catalyst substrate during the wet transfer process has two further main cost components: (1) the cost of the copper etchant solution; and (2) the cost associated with hazardous waste handling after the wet transfer process is completed.

Another disadvantage to the current wet transfer process is that extended soaking of the layered structure in the etchant solution introduces contaminants and defects to the graphene layer and the target substrate layer, which can diminish the quality of the final product. Similarly, it is time consuming to wash/remove the contaminants of the etchant solution away from the resulting graphene-polymer sandwich.

Recently, oxidation of the surface of the metal catalyst substrate has emerged as an alternative transfer method, which allows the metal substrate layer to be reused and eliminates the need for etching. In this regard, oxidation of the metal catalyst substrate is believed to reduce the adhesion energy between the graphene layer (or other 2D material) and the metal substrate, which allows for mechanical delamination and different chemical delamination methods. One method of oxidation of the surface of the metal catalyst substrate is soaking the layered 2D material/metal catalyst substrate structure in water. Alternatively, the layered structure may be exposed to a water vapor. The water is believed to intercalate between the metal catalyst substrate and graphene layer to oxidize the surface of the metal substrate at the graphene interface, which reduces the bonding energy between the graphene and the catalyst substrate. Depending on the temperature of the water, the thickness of the graphene layer (or number of layers of graphene), and the area of the metal-graphene interface, the layered structure is typically soaked for a period of hours or days. Exposure of the structured layer to a water vapor typically requires an even longer exposure time than soaking the structured layer in liquid water. After soaking or exposure to the water vapor for a sufficient time, the graphene layer and target substrate may be "peeled off" the metal substrate using mechanical force, removed using a chemical delamination method, or removed through other delamination methods as known in the art.

While oxidation of the metal substrate is a promising alternative to using an etchant as it seeks to allow the metal catalyst substrate to be reused, the oxidation method using water and/or water vapor has its own inefficiencies and disadvantages. In particular, in order to prevent tearing and to maintain the quality of the graphene layer, the surface of the metal substrate should be evenly oxidized. In this regard, uneven oxidation of the metal catalyst substrate leads to poor graphene quality upon delamination. Further, if some portions of the metal catalyst substrate are left un-oxidized, the graphene will still be strongly bound to the catalyst substrate. Graphene that is delaminated from the unevenly oxidized metal catalyst substrate has frequent holes and ruptures in the graphene layer.

In principle, uneven oxidation of the metal catalyst substrate can be mitigated by lower temperatures during the soaking of the layered structure in the water. However, this requires that the layered structure be soaked in water for long period of time to ensure the surface of the metal substrate is sufficiently oxidized. However, extended soaking of the metal catalyst substrate makes the delamination process economically unfeasible. Further, extended soak times can cause substantial corrosion of the catalyst substrate, which ultimately prevents the metal catalyst substrate from being reused.

What is needed, therefore, is an economically viable method for delaminating graphene and other 2D materials from a metal catalyst substrate such as copper.

SUMMARY

According to one embodiments of the disclosure, a method for delaminating a 2D material from a metal catalyst substrate includes depositing the 2D material on the metal catalyst substrate forming a layered structure; and soaking the layered structure in a water-based solution comprising water and a water-miscible organic solvent such that the water-based solution intercalates between the 2D material and the metal catalyst substrate and oxidizes a surface of the metal catalyst substrate for delamination of the 2D material from the metal catalyst substrate.

According to certain embodiments, the metal catalyst substrate includes copper, nickel, or an alloy thereof.

According to certain embodiments, the 2D material is one of graphene and hexagonal boron nitride.

According to certain embodiments, the water-miscible organic solvent includes about 5% to about 30% by weight of the water-based solution.

According to certain embodiments, the method further includes heating the water-based solution to a temperature between about room temperature up to a boiling temperature of the water-based solution.

According to certain embodiments, the water-miscible organic solvent includes at least one of isopropyl alcohol, ethanol, methanol, glycerol, and acetone.

According to certain embodiments, the method further includes binding a target substrate to an exposed surface of the 2D material. According to some embodiments, the target substrate is a polymer. According to some embodiments, the polymer is selected from the group consisting of polyamides, polyimides, polyolefins, polyvinyl chloride, polyvinyl alcohol, poly(methyl methacrylate), lacquer, polycarbonate, polystyrene, polydimethylsiloxane, polyvinylpyrrolidone, perfluorosulfonic acid polymer (Nafion™), Kapton™ tape, and silicate glass.

According to certain embodiments, the method further includes delaminating the 2D material from the metal catalyst substrate.

According to another embodiment of the disclosure, a method for delaminating a graphene layer from a metal catalyst substrate includes depositing the graphene layer on the metal catalyst substrate forming a layered structure; providing a water-based solution comprising water and a water-miscible organic solvent; heating the water-based solution to a temperature between about room temperature up to a boiling temperature of the water-based solution; soaking the layered structure in the water-based solution such that the water-based solution intercalates between the graphene layer and the metal catalyst substrate and oxidizes a surface of the metal catalyst substrate; and delaminating the graphene layer from the metal catalyst substrate.

According to certain embodiments, the metal catalyst substrate includes copper, nickel, or an alloy thereof.

According to certain embodiments, the water-miscible organic solvent includes about 5% to about 30% by weight of the water-based solution.

According to certain embodiments, the method further includes heating the water-based solution to a temperature between about 25° C. to about 45° C.

According to certain embodiments, the water-miscible solvent includes at least one of isopropyl alcohol, ethanol, methanol, glycerol, and acetone.

According to certain embodiments, the method further includes binding a target substrate to an exposed surface of the graphene layer. In some embodiments, the target substrate is a polymer.

According to yet another embodiment of the disclosure, a solution for facilitating delamination of a graphene layer from a metal catalyst substrate includes a first component comprised of water and a second component comprising a water-miscible organic solvent.

According to certain embodiments, the water-miscible solvent is one of isopropyl alcohol, ethanol, methanol, glycerol, and acetone.

According to certain embodiments, the second component includes between about 5-30% of the solution by weight.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Other embodiments of the invention will become apparent by reference to the detailed description in conjunction with the figures, wherein elements are not to scale so as to more clearly show the details, and wherein like reference numbers indicate like elements throughout the several views, and wherein.

DETAILED DESCRIPTION

In the following detailed description, reference is made to the accompanying drawings, which form a part hereof. The illustrative embodiments described in the detailed description, drawings, and claims are not meant to be limiting in scope. Other embodiments may be utilized, and other changes may be made without departing from the spirit or scope of the subject matter presented herein. This disclosure is generally drawn to methods, apparatuses, systems, and/or devices related to delaminating graphene from metal catalyst substrates including pure copper, nickel and copper-nickel alloys. However, it should be understood that the disclosure is also applicable to delaminating hexagonal boron nitride (hBN) and other 2D materials from any metal catalyst substrate as known in the art.

Figure 1:
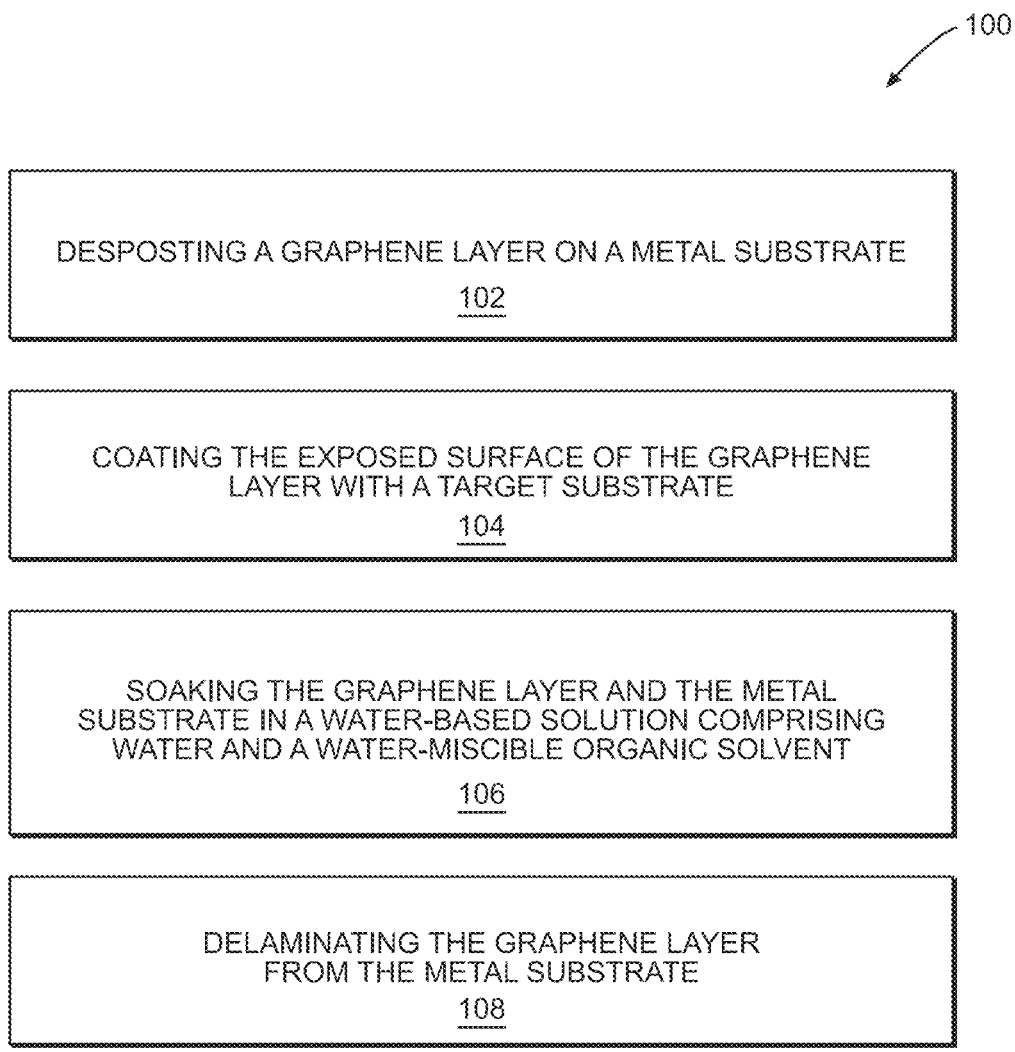
FIG. 1 depicts a method for delaminating a graphene layer from a metal substrate.
Figure 2A:
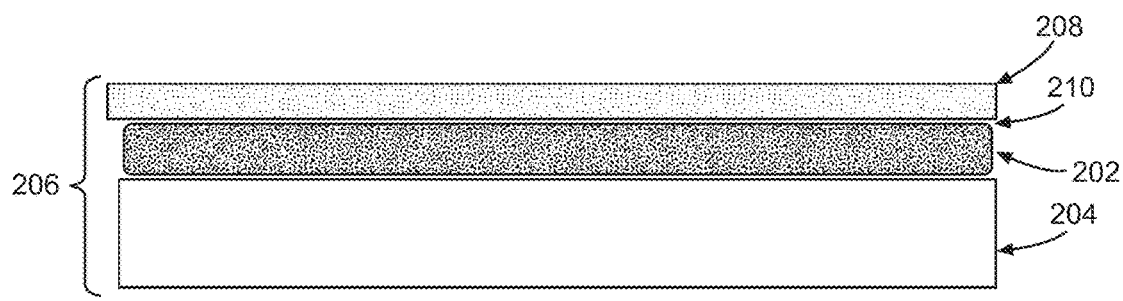
FIGS. 2A-2C depict the deposition of a graphene layer on a metal substrate, submersion of the graphene-metal bilayer in a solution, and oxidation of the metal substrate, respectively.
Figure 2B:
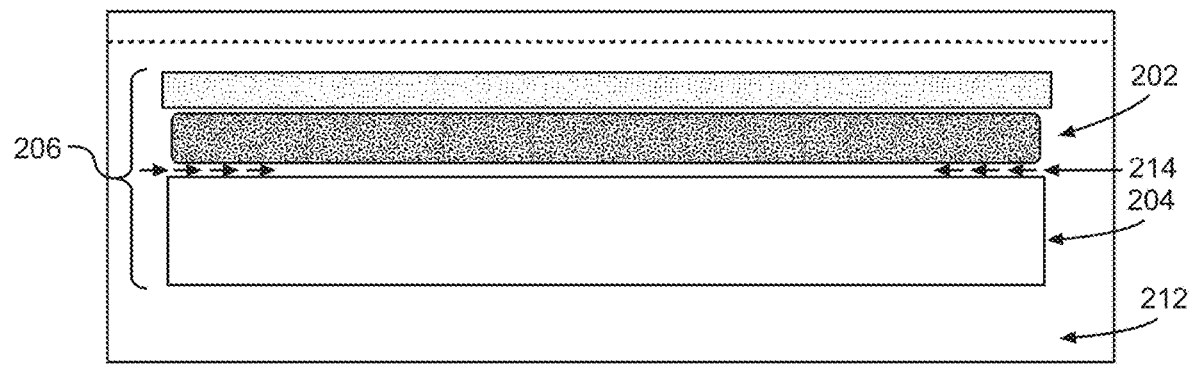
Figure 2C:
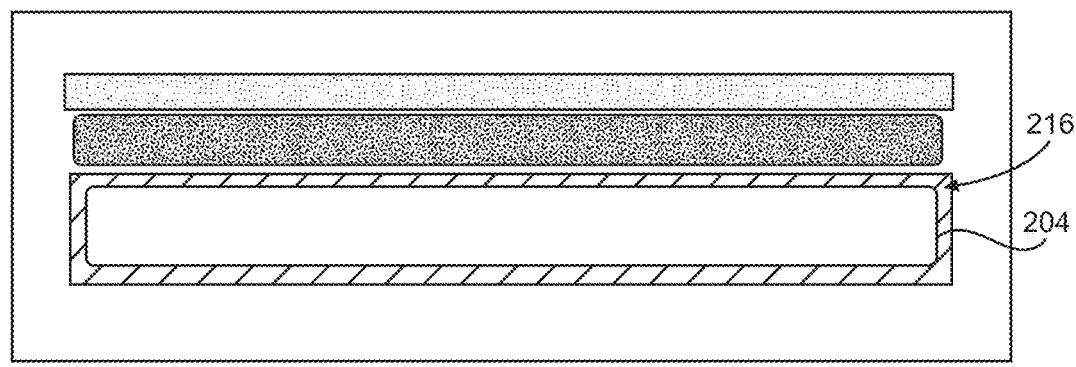

FIG. 1 depicts a flow chart of a method 100 for delaminating a graphene layer from a metal catalyst substrate using a water-based solution according to the present disclosure. FIGS. 2A-2C depict a layered structure 206 during particular steps of the method. With reference to FIG. 1, the method 100 preferably begins at step 102 where a graphene layer is deposited or grown on a metal catalyst substrate. For example, the graphene layer may be deposited on the metal substrate using chemical vapor deposition. In preferred embodiments, the metal catalyst substrate is formed of copper, nickel, or a copper-nickel alloy. However, it should be understood that method 100 may be used to delaminate graphene and other 2D materials such as hBN from other metal catalyst substrates as known in the art. The metal catalyst substrate may be cleaned, annealed, and/or treated to facilitate graphene growth on its surface. During deposition, the graphene layer binds to the metal substrate typically with an adhesion energy between 1 J/m$^2$ and 12 J/m$^2$.

With reference to FIG. 2A, a layered structure 206 formed during step 102 is exemplified with a graphene layer 202 bound to a metal catalyst substrate 204.

According to some embodiments, and with continued reference to FIG. 1 and FIG. 2A, a target substrate 208 may be bound to surface 210 of the graphene layer 202 in step 104. In certain embodiments, the target substrate 208 may be a polymer such as polyamides, polyimides, polyolefins, PVC, PVA, poly(methyl methacrylate), lacquer, polycarbonate, polystyrene, polydimethylsiloxane, polyvinylpyrrolidone, perfluorosulfonic acid polymer (Nafion™), Kapton™ tape, silicate glass, etc. The target substrate 208 may be bound to the surface 210 of the graphene layer 202 by dip coating, spray coating, lamination, hot press, hot rollers, or any other known methods. In certain embodiments, the material of the target substrate 208 may be chosen based on particular application requirements for the graphene layer 202.

With reference to FIG. 1 and FIG. 2B, the layered structure 206 is submerged in a water-based solution 212 in step 106. According to certain embodiments, the layered structure 206 is submerged in the water-based solution 212 after the target substrate 208 is bound to the exposed surface 210 of the graphene layer 202 as shown in FIG. 1. However, in other embodiments, the target substrate 208 is bound to the surface 210 of the graphene layer 202 after the layered structure 206 is removed from the water-based solution 212. In other words, step 104 of FIG. 1 may be performed before or after step 106. The water-based solution 212 includes a first part water and a second part water-miscible organic solvent. Potential water-miscible organic solvents include, but are not limited to, acetaldehyde, acetic acid, acetone, acetonitrile, 1,2-Butanediol, 1,4-Butanediol, 2-Butoxyethanol, butyric acid, diethanolamine, diethylenetriamine, dimethylformamide, dimethoxyethane, dimethyl sulfoxide, 1,4-Dioxane, ethanol, ethylamine, ethylene glycol, formic acid, furfuryl alcohol, glycerol, isopropyl alcohol (IPA), methanol, methyl diethanolamine, methyl isocyanide, N-Methyl-2-pyrrolidone, 1-Propanol, 1,3-Propanediol, 1,5-Pentanediol, 2-Propanol, propanoic acid, propylene glycol, pyridine, tetrahydrofuran, triethylene glycol, and combinations thereof.

In preferred embodiments, the water-miscible organic solvent is at least one of acetone or an alcohol such as IPA, ethanol, methanol, glycerol, etc. In most preferred embodiments, the organic solvent is an alcohol.

In certain embodiments, the water-based solution 212 includes anywhere between about 1-99% by weight of the water-miscible organic solvent. In preferred embodiments, the water-miscible organic solvent makes up about 5% to about 30% by weight of the water-based solution 212.

According to some embodiments, the water-based solution 212 may also include carbon dioxide and/or an ionic species to increase ionic strength and adjust the pH of the water-based solution 212.

In certain embodiments, the layered structure 206 may be submerged in the water-based solution 212 between about 60 minutes and about 100 hours. More preferably, the soak time is between about 6 hours and 72 hours, and most preferably between about 12 hours and about 36 hours. However, soak time is largely dependent on the thickness/number of layers of the 2D material disposed on the metal catalyst substrate layer 204 as well as other factors such as temperature, organic solvent selected, amount of organic solvent in the water-based solution etc.

In certain embodiments, the water-based solution 212 may be heated to a temperature between 0° C. and 90° C. (or generally not to exceed the boiling point of the water-based solution) while the layered structure 206 is submerged in the water-based solution 212. In more preferred embodiments, the water-based solution is heated to a temperature between about room temperature/25° C. and about 70° C., and most preferably between about 35° C. and about 50° C.

With continued reference to FIG. 2B, and as indicated by arrows 214, the water-based solution 212 intercalates between the graphene layer 202 and the metal catalyst substrate 204 while the layered structure 206 is submerged in step 106. As represented by FIG. 2C, soaking the layered structure 206 creates an outer oxidized portion 216 of the metal catalyst substrate 204 including at the graphene-metal interface.

With reference back to FIG. 1, after soaking in step 106, the graphene layer 202 with accompanying target substrate 208 may be delaminated from the oxidized metal substrate 302 in step 108. For purposes of the present disclosure, the delamination step may be performed according to any technique as known in the art.

As noted in the Background section herein, when submerged in water or exposed to water vapor, the rate of oxidation across the surface of the metal catalyst substrate 204 will be non-uniform because of different grain orientations in the metal. Graphene that is delaminated from a metal catalyst substrate 204 having an uneven oxidized surface has a high density of holes and ruptures in the graphene. On the other hand, as exemplified in the below examples and without wishing to be bound by any particular theory, it has been found that the addition of a water-miscible organic solvent to the water leads to much more consistent and faster oxidation of the metal catalyst substrate 204. In turn, this results in higher quality graphene delamination from the metal catalyst substrate. In addition, it has been found that agitating the water-based solution during the soaking further improves the consistency and potentially rate of oxidation.

EXAMPLES

Figure 3A:
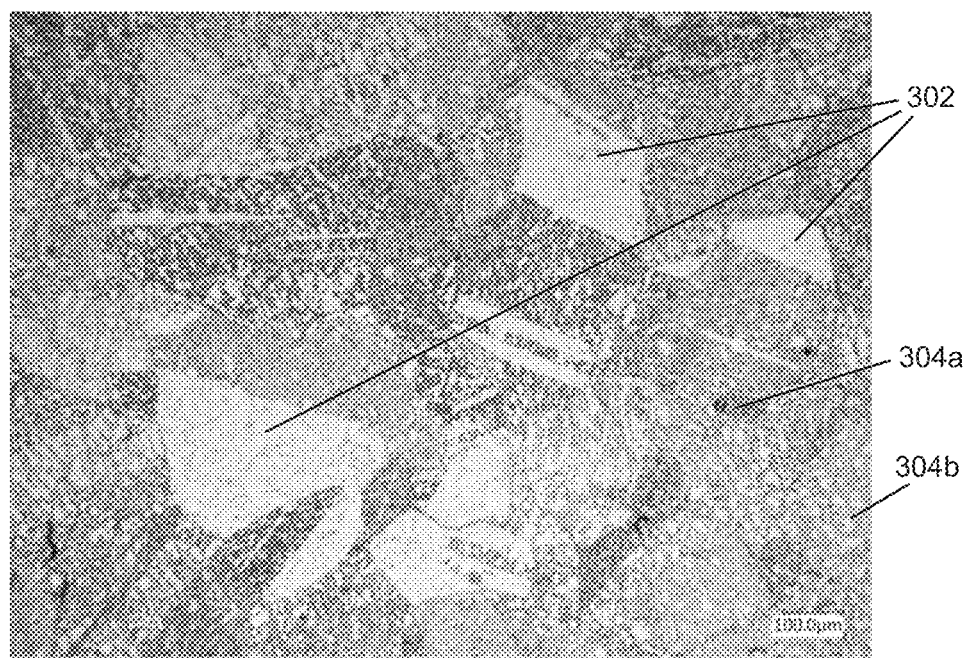
FIG. 3A is a micrograph of the surface of a copper substrate that has been soaked in a water bath under certain conditions.

FIG. 3A depicts an optical image of a thin layer of graphene on a copper substrate (the graphene being essentially transparent as a 2D material). This sample was oxidized in a water bath at 38° C. for approximately 24 hours. In general, unoxidized portions of copper appear white in optical images. Regions in which the copper is oxidized will have a darker color (tan or brown in color images). The relative darkness and color of the oxidized portions will change depending on the thickness (and type) of the oxide. Thus, as shown in FIG. 3A, this sample includes large unoxidized regions 302 (i.e., large white regions). The sample also includes oxidized regions with varying thicknesses. For example, oxidized region 304a includes an oxidized thickness that is significantly greater than the oxidized thickness of oxidized region 304b as evidenced by the darker color of region 304a as compared to region 304b.

Figure 3B:
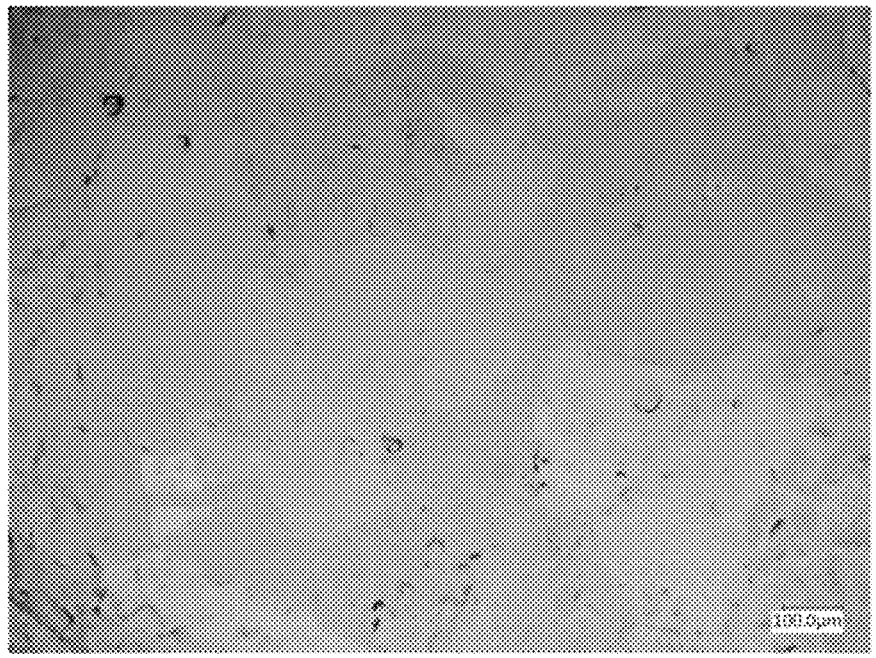
FIG. 3B is a micrograph of the surface of a copper substrate that has been soaked in an agitated water-based solution according to one embodiment of the present disclosure.

On the other hand, FIG. 3B depicts an optical image of a thin layer of graphene on a copper substrate after being oxidized in a water bath also at 38° C. for approximately 24 hours. However, the water bath of this embodiment included approximately 10% IPA and 90% water in the water-based solution. As shown in the comparison of FIG. 3B to FIG. 3A, the addition of IPA to the water bath provided more even and complete oxidation of the sample. Additionally, when oxidized with water alone, the sample of FIG. 3A was determined to have a sheet resistance of approximately 20 kΩ/sq whereas the sample of FIG. 3B was determined to have a sheet resistance of approximately 0.6 KOhm/sq. Thus, given the more consistent/complete oxidation and decrease in sheet resistance of the sample of FIG. 3B as compared to the sample of FIG. 3A, the oxidation of the graphene and copper layered structure in the water-based solution with organic solvent aids in the delamination of higher quality graphene as compared to being oxidized in water alone.

Figure 3C:
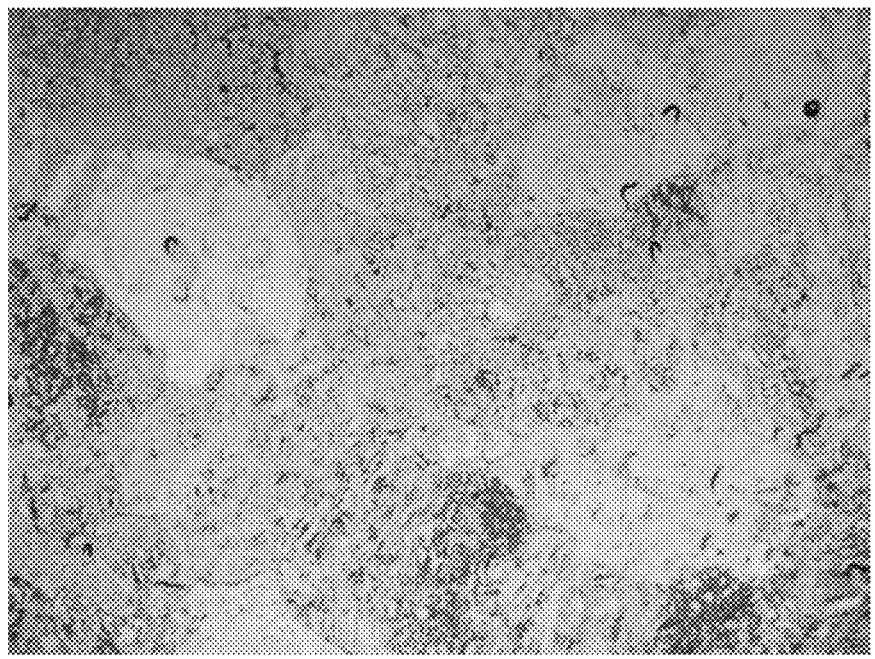
FIG. 3C is a micrograph of the surface of a copper substrate that has been soaked in the same water-based solution as FIG. 3B but in a non-agitated state.

As noted above, it is also believed that agitation of the water-based solution of the present disclosure enhances uniformity of the oxidation. The layered structure of FIG. 3B was soaked in a continually agitated solution of 10% IPA and 90% water. On the other hand, FIG. 3C depicts an optical image of a thin layer of graphene on a copper substrate after being oxidized in the same solution of 10% IPA and 90% water at 38° C. for approximately 24 hours. However, the layered structure of FIG. 3C was soaked in a stagnant solution. Although the image sample of FIG. 3C is shown as being well oxidized, the oxidation is not as uniform as the sample of FIG. 3B as evidenced by the darker regions 306 as well as the general variance in color along the sample.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for delaminating a 2D material from a metal catalyst substrate, the method comprising:
   depositing the 2D material on the metal catalyst substrate for forming a layered structure; and
   soaking the layered structure in a water-based solution comprising water and a water-miscible organic solvent such that the water-based solution intercalates between the 2D material and the metal catalyst substrate and oxidizes a surface of the metal catalyst substrate for delamination of the 2D material from the metal catalyst substrate,
   wherein the water-miscible organic solvent comprises about 5% to about 30% by weight of the water-based solution.

2. The method of claim 1 wherein the metal catalyst substrate comprises copper, nickel, or an alloy thereof.

3. The method of claim 1 wherein the 2D material is one of graphene and hexagonal boron nitride.

4. The method of claim 1 further comprising heating the water-based solution to a temperature between about room temperature to a boiling temperature of the water-based solution.

5. The method of claim 1 wherein the water-miscible organic solvent includes at least one of isopropyl alcohol, ethanol, methanol, glycerol, and acetone.

6. The method of claim 1 further comprising binding a target substrate to an exposed surface of the 2D material.

7. The method of claim 6 wherein the target substrate is a polymer.

8. The method of claim 7 wherein the polymer is selected from the group consisting of polyamides, polyimides, polyolefins, polyvinyl chloride, polyvinyl alcohol, poly(methyl methacrylate), lacquer, polycarbonate, polystyrene, polydimethylsiloxane, polyvinylpyrrolidone, perfluorosulfonic acid polymer, and silicate glass.

9. The method of claim 1 further comprising delaminating the 2D material from the metal catalyst substrate.

10. The method of claim 1 further comprising agitating the water-based solution during the soaking step.

11. A method for delaminating a graphene layer from a metal catalyst substrate, the method comprising:
    depositing the graphene layer on the metal catalyst substrate for forming a layered structure;
    providing a water-based solution comprising water and a water-miscible organic solvent wherein the water-miscible organic solvent comprises about 5% to about 30% by weight of the water-based solution;
    heating the water-based solution to a temperature between about room temperature up to a boiling temperature of the water-based solution;
    soaking the layered structure in the water-based solution such that the water-based solution intercalates between the graphene layer and the metal catalyst substrate and oxidizes a surface of the metal catalyst substrate; and
    delaminating the graphene layer from the metal catalyst substrate.

12. The method of claim 11 wherein the metal catalyst substrate comprises copper, nickel, or an alloy thereof.

13. The method of claim 11 further comprising heating the water-based solution to a temperature between about 25° C. to about 45° C.

14. The method of claim 11 wherein the water-miscible organic solvent includes at least one of isopropyl alcohol, ethanol, methanol, glycerol, and acetone.

15. The method of claim 11 further comprising binding a target substrate to an exposed surface of the graphene layer.

16. The method of claim 15 wherein the target substrate is a polymer.

17. The method of claim 11 further comprising agitating the water-based solution during the soaking step.

* * * * *